(12) United States Patent
Lin

(10) Patent No.: US 8,109,354 B2
(45) Date of Patent: Feb. 7, 2012

(54) OXYHYDROGEN VEHICLE

(75) Inventor: Wen-Chang Lin, Kaohsiung County (TW)

(73) Assignee: Yu Chuan Technology Enterprise Co., Ltd., Kaohsiung County (TW)

( * ) Notice: Subject to any disclaimer, the term of this patent is extended or adjusted under 35 U.S.C. 154(b) by 415 days.

(21) Appl. No.: 12/371,148

(22) Filed: Feb. 13, 2009

(65) Prior Publication Data

US 2010/0206646 A1 Aug. 19, 2010

(51) Int. Cl.
*B60K 16/00* (2006.01)

(52) U.S. Cl. ............................ 180/65.31; 180/2.2; 123/3

(58) Field of Classification Search ............... 180/65.21, 180/65.265, 65.29, 65.31, 302; 123/1 A, 123/3, DIG. 12, 575
See application file for complete search history.

(56) References Cited

U.S. PATENT DOCUMENTS

| | | | | | |
|---|---|---|---|---|---|
| 1,379,077 | A | * | 5/1921 | Blumenberg, Jr. | 123/537 |
| 3,311,097 | A | * | 3/1967 | Mittelstaedt | 123/537 |
| 4,077,367 | A | * | 3/1978 | Steiger | 123/23 |
| 4,141,425 | A | * | 2/1979 | Treat | 180/2.2 |
| 4,317,709 | A | * | 3/1982 | Ichisaka et al. | 204/268 |
| 4,429,675 | A | * | 2/1984 | Talbert | 123/558 |
| 5,143,025 | A | * | 9/1992 | Munday | 123/3 |
| 5,305,715 | A | * | 4/1994 | Nissley | 123/3 |
| 5,458,095 | A | * | 10/1995 | Post et al. | 123/3 |
| 5,614,069 | A | * | 3/1997 | Lin | 204/268 |
| 5,888,361 | A | * | 3/1999 | Hirai et al. | 204/262 |
| 6,068,741 | A | * | 5/2000 | Lin | 204/239 |
| 6,258,221 | B1 | * | 7/2001 | Lin | 204/239 |
| 6,630,061 | B2 | * | 10/2003 | Lee et al. | 204/270 |
| 6,856,116 | B1 | * | 2/2005 | Kirkpatrick | 320/101 |
| 7,021,050 | B2 | * | 4/2006 | Nishimura et al. | 60/295 |
| 7,021,249 | B1 | * | 4/2006 | Christison | 123/3 |
| 7,100,542 | B2 | * | 9/2006 | Ehresman | 123/3 |
| 7,357,102 | B1 | * | 4/2008 | Lin et al. | 123/1 A |
| 7,654,233 | B2 | * | 2/2010 | Lin et al. | 123/3 |
| 2002/0153178 | A1 | * | 10/2002 | Limonius | 180/2.2 |
| 2005/0000802 | A1 | * | 1/2005 | Hobbs | 204/277 |
| 2005/0268555 | A1 | * | 12/2005 | Amendola et al. | 48/61 |
| 2006/0113118 | A1 | * | 6/2006 | Kim | 180/2.2 |
| 2006/0213697 | A1 | * | 9/2006 | Sutherland | 180/2.2 |
| 2007/0235326 | A1 | * | 10/2007 | Lin | 204/278 |
| 2008/0105218 | A1 | * | 5/2008 | Lin | 123/3 |
| 2008/0190383 | A1 | * | 8/2008 | Lin | 123/3 |
| 2010/0206646 | A1 | * | 8/2010 | Lin | 180/2.2 |

FOREIGN PATENT DOCUMENTS

TW 313627 6/2007

* cited by examiner

*Primary Examiner* — J. Allen Shriver, II
*Assistant Examiner* — Jacob Meyer
(74) *Attorney, Agent, or Firm* — McNees Wallace & Nurick

(57) ABSTRACT

An oxyhydrogen vehicle includes an oxyhydrogen generating unit for electrolytically converting an electrolyte into oxyhydrogen gas, a combustible fuel supply unit for storing combustible fuel, an engine unit coupled to the oxyhydrogen generating unit and the combustible fuel supply unit, and an electric power supply system electrically connected to the oxyhydrogen generating unit for providing electric power thereto. The electric power supply system includes: a storage battery; an alternator driven by the engine unit to generate an electrical output, and electrically connected to the storage battery; a current controller electrically connecting the storage battery and the alternator to the oxyhydrogen generating unit for controlling electric current flow to the oxyhydrogen generating unit; and an auxiliary electricity generating unit electrically connected to the storage battery, and driven by renewable energy resources so as to generate an electrical output for charging the storage battery.

10 Claims, 5 Drawing Sheets

OXYHYDROGEN VEHICLE

BACKGROUND OF THE INVENTION

1. Field of the Invention

The present invention relates to an oxyhydrogen vehicle, more particularly to an oxyhydrogen vehicle provided with an auxiliary electricity generating unit.

2. Description of the Related Art

Referring to FIG. 1, Taiwanese Utility Model Publication No. 313627 discloses an oxyhydrogen vehicle that includes: a vehicle body 11; an engine unit 12 disposed on the vehicle body 11; a plurality of transmission shafts 13 disposed on the vehicle body 11; a plurality of alternators 14 disposed on the vehicle body 11 and driven by the transmission shafts 13 to generate electric power for charging an additional battery 15 electrically connected thereto; and an electrolytic converter 16 electrically connected to the additional battery 15 and utilizing the electric power therefrom to electrolytically convert an electrolyte into oxyhydrogen gas. Further, the engine unit 12 mixes the oxyhydrogen gas and combustible fuel to result in hybrid fuel, and a cylinder block thereof provides a mechanical power output from combustion of the hybrid fuel.

However, when a vehicle runs at a fast speed, fuel consumption of the engine unit 12 increases, but the electrolytic converter 16 cannot correspondingly provide an appropriate amount of oxyhydrogen gas for generating the hybrid fuel required by the engine unit 12. Moreover, the plurality of alternators 14 and the additional battery 15 increase an overall weight of the vehicle, such that the fuel consumption correspondingly increases.

In commonly owned co-pending U.S. patent application Ser. No. 12/036,835, there is disclosed an engine device for an oxyhydrogen vehicle. The engine device includes an oxyhydrogen generator for electrolytically converting an electrolyte into oxyhydrogen gas, a fuel tank for storing combustible fuel, a first pipe unit connected to the oxyhydrogen generator, a second pipe unit connected to the fuel tank, and an engine unit. The engine unit includes a cylinder block, an intake manifold, and fuel injectors. The intake manifold is connected to the cylinder block, is provided with passages, and is further connected to the first pipe unit such that the oxyhydrogen gas generated by the oxyhydrogen generator is fed into the passages. The fuel injectors are connected to the intake manifold, are further connected to the second pipe unit, and serve to inject the combustible fuel in the fuel tank into the passages. The entire disclosure of the co-pending application is incorporated herein by reference.

SUMMARY OF THE INVENTION

Therefore, an object of the present invention is to provide an oxyhydrogen vehicle provided with an auxiliary electricity generating unit that is adapted to be driven by renewable energy resources and that generates an electrical output for charging a storage battery which provides electric power to an oxyhydrogen generating unit.

Accordingly, an oxyhydrogen vehicle of the present invention comprises an oxyhydrogen generating unit for electrolytically converting an electrolyte into oxyhydrogen gas, a combustible fuel supply unit for storing combustible fuel, an engine unit coupled to the oxyhydrogen generating unit and the combustible fuel supply unit, and an electric power supply system electrically connected to the oxyhydrogen generating unit for providing electric power thereto.

The engine unit mixes the oxyhydrogen gas from the oxyhydrogen generating unit and the combustible fuel from the combustible fuel supply unit to result in hybrid fuel, and provides a mechanical power output from combustion of the hybrid fuel.

The electric power supply system includes: a storage battery; an alternator coupled to and driven by the engine unit so as to generate an electrical output, and electrically connected to the storage battery for charging the storage battery; a current controller electrically connecting the storage battery and the alternator to the oxyhydrogen generating unit for controlling electric current flow to the oxyhydrogen generating unit; and an auxiliary electricity generating unit electrically connected to the storage battery, and adapted to be driven by renewable energy resources selected from the group consisting of solar energy, wind energy and combinations thereof so as to generate an electrical output for charging the storage battery.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
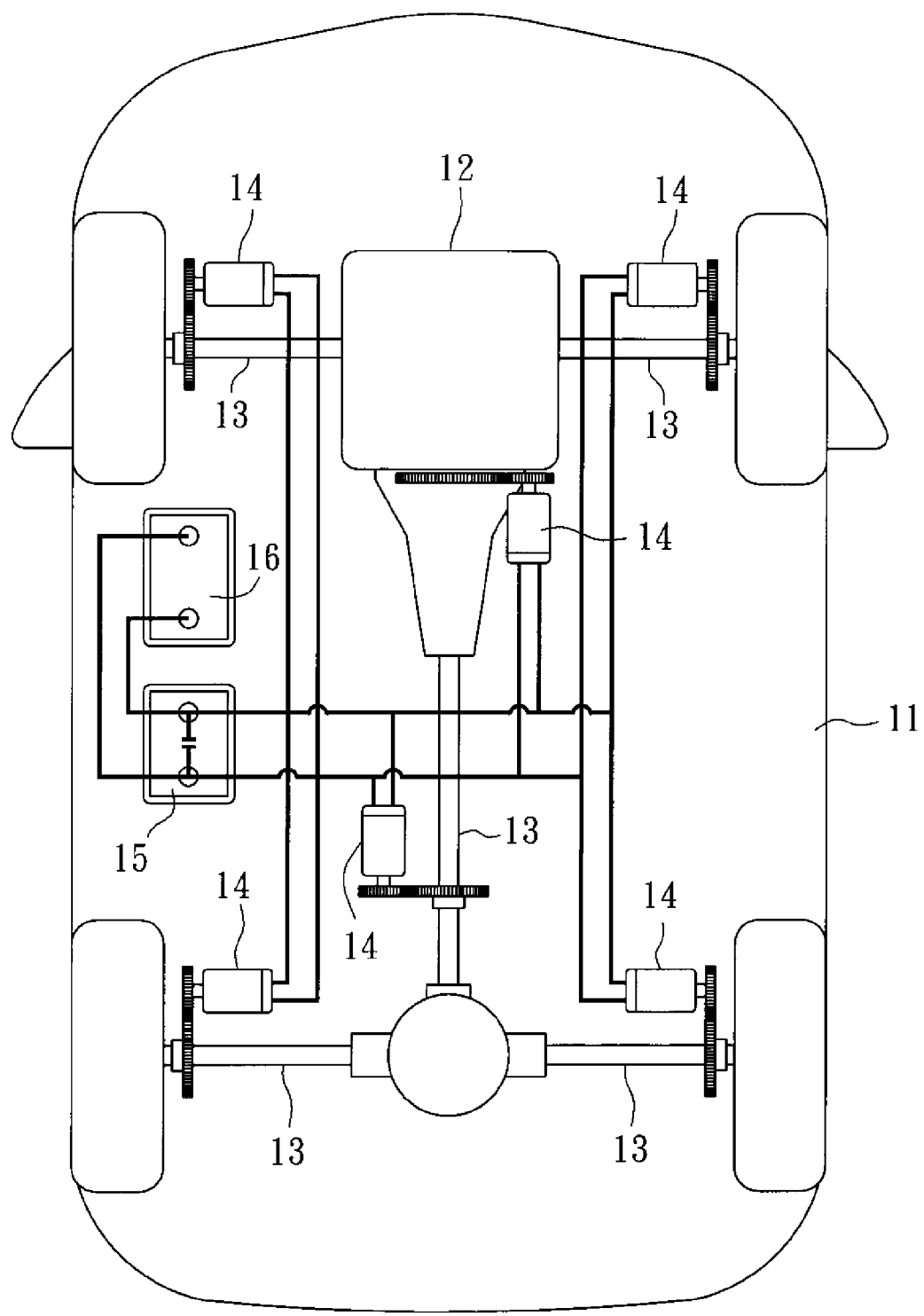
FIG. 1 is a schematic diagram of an oxyhydrogen vehicle disclosed in Taiwanese Utility Model Publication No. 313627.
Figure 2:
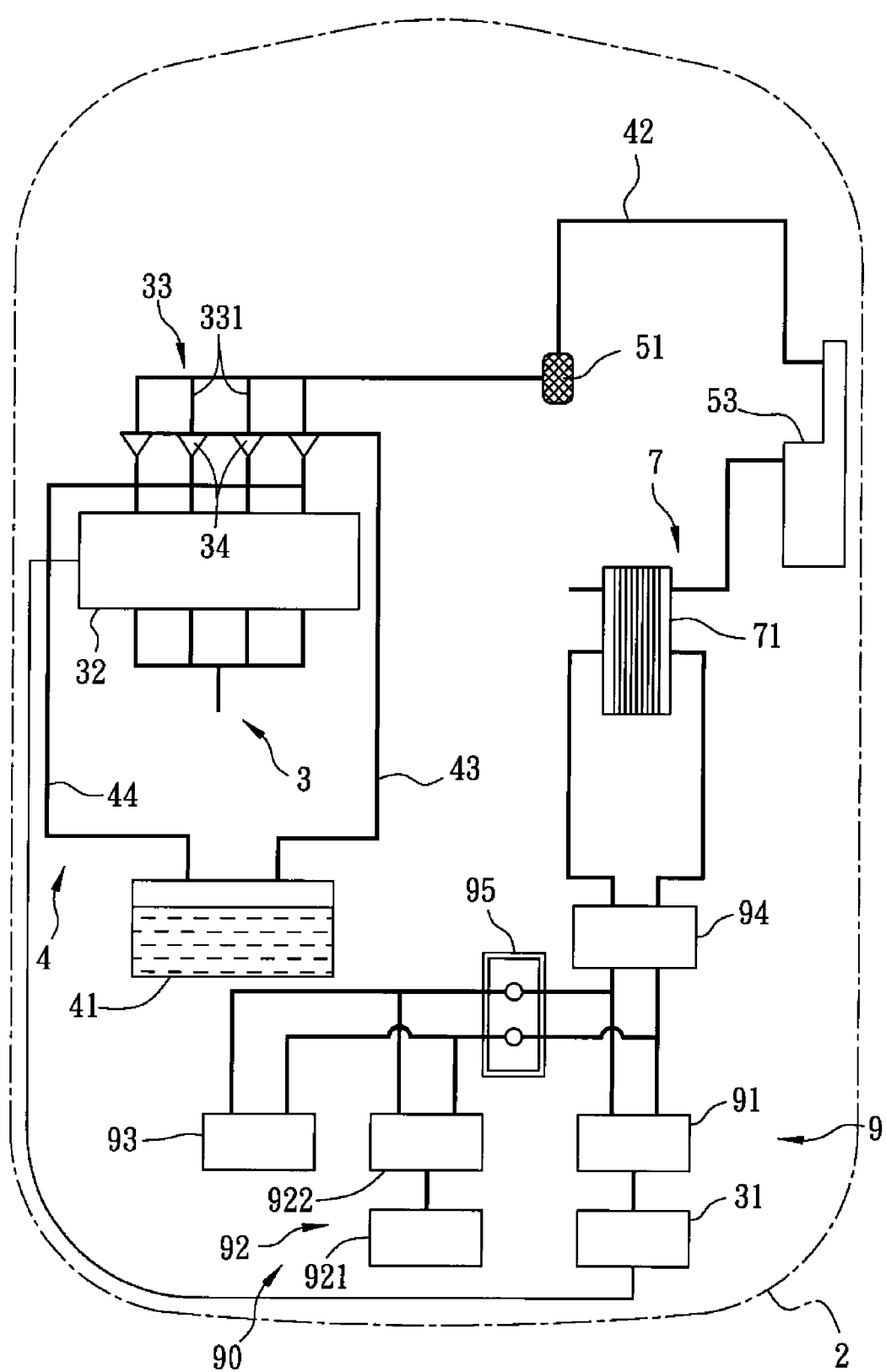
FIG. 2 is a schematic diagram of the preferred embodiment of an oxyhydrogen vehicle according to the present invention.

Referring to FIG. 2, the preferred embodiment of an oxyhydrogen vehicle according to the present invention is shown to include a vehicle body 2, an oxyhydrogen generating unit 7, a combustible fuel supply unit 4, an engine unit 3 coupled to the oxyhydrogen generating unit 7 and the combustible fuel supply unit 4, and an electric power supply system 9 electrically connected to the oxyhydrogen generating unit 7.

Figure 3:
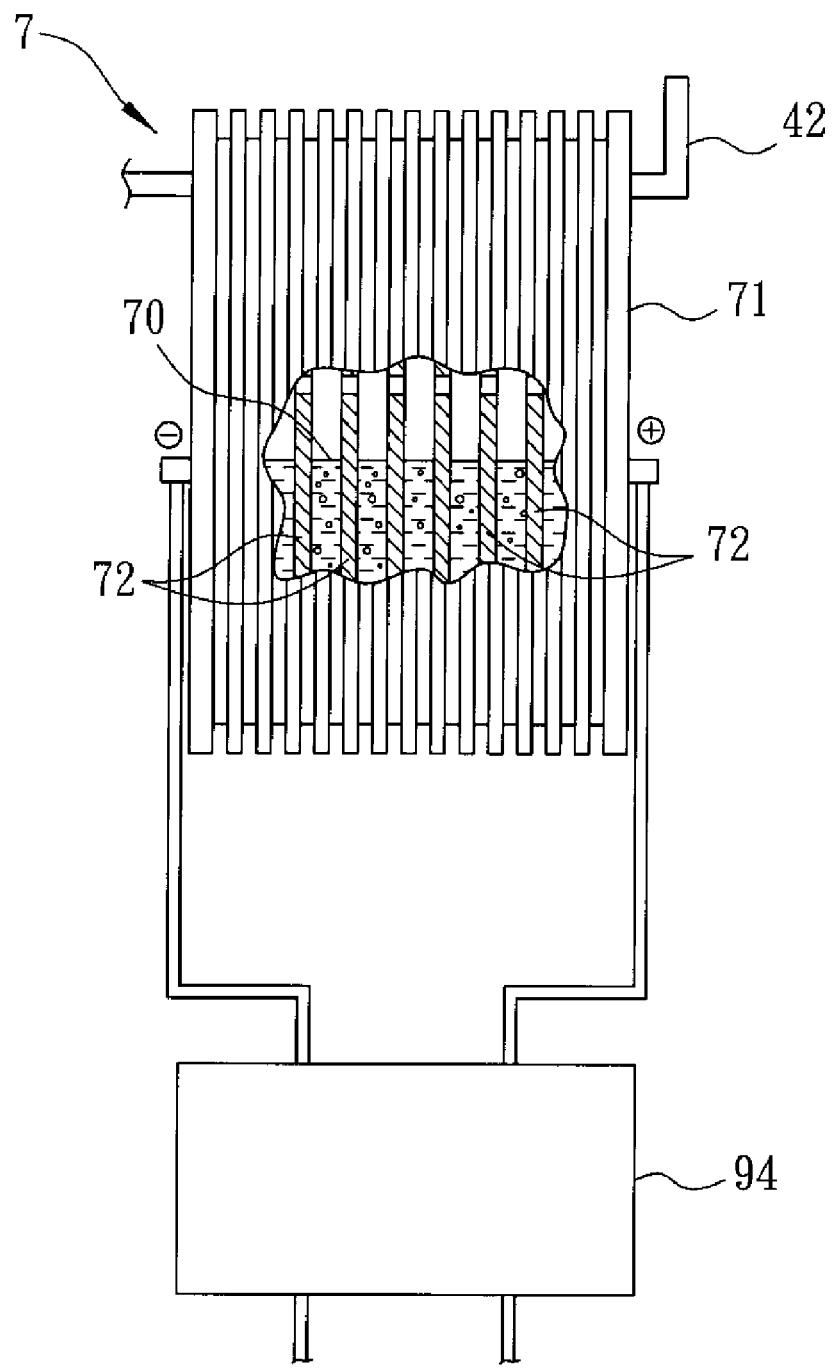
FIG. 3 is a schematic diagram illustrating an oxyhydrogen generating unit of the preferred embodiment.

Referring to FIGS. 2 and 3, the oxyhydrogen generating unit 7 is disposed on the vehicle body 2 and includes an electrolyte container 71 for receiving an electrolyte 70, a plurality of electrode plates 72 disposed in the electrolyte container 71 in spaced apart relation to one another, and an oxyhydrogen gas pipe 42 interconnecting the electrolyte container 71 and the engine unit 3. The oxyhydrogen generating unit 7 is operable to electrolytically convert the electrolyte 70 in the electrolyte container 71 into oxyhydrogen gas in a known manner.

Figure 5:
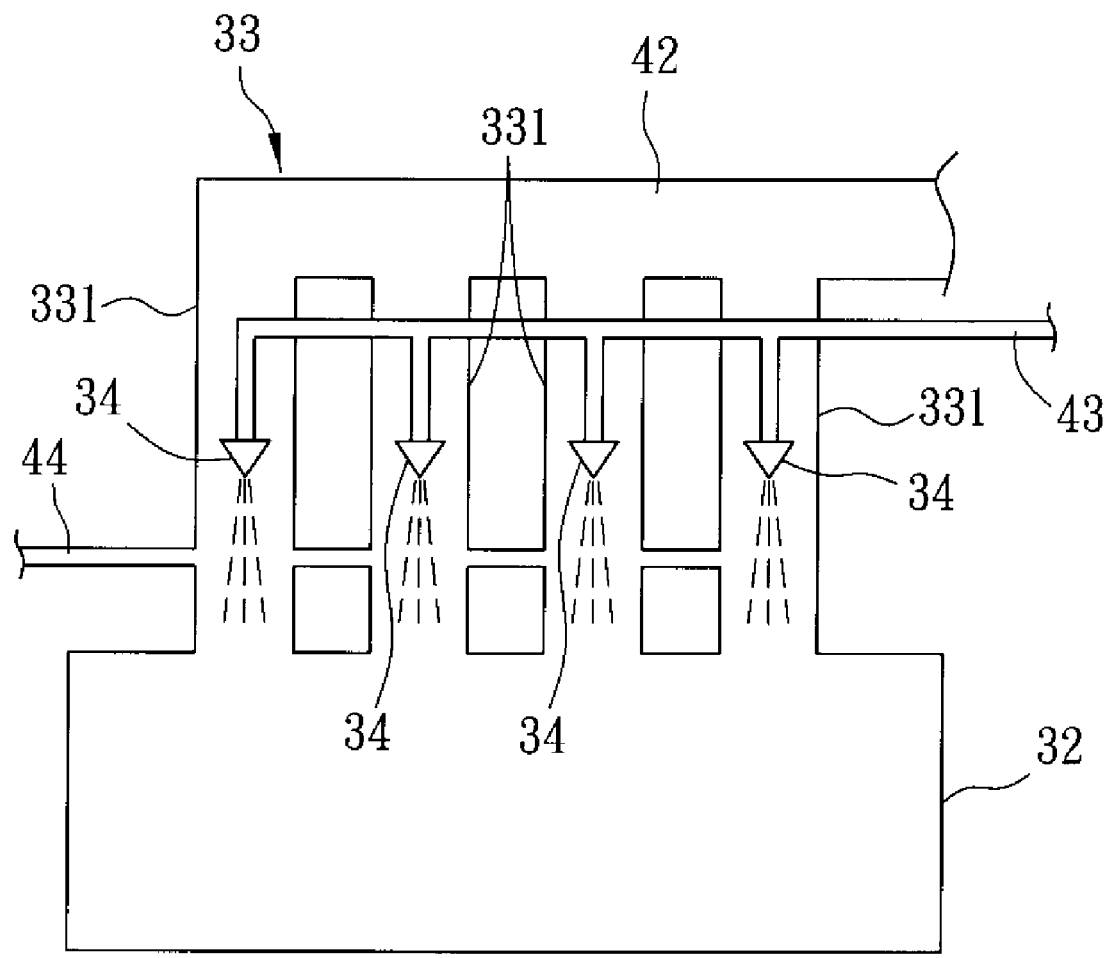
FIG. 5 is a schematic diagram illustrating how oxyhydrogen gas is mixed with combustible fuel in the preferred embodiment.

Referring to FIGS. 2 and 5, the combustible fuel supply unit 4 is disposed on the vehicle body 2 and includes a fuel tank 41 for storing combustible fuel (e.g., a hydrocarbon fuel), a fuel-feeding pipe 43 connected to the engine unit 3 for feeding the combustible fuel to the engine unit 3, and a fuel-returning pipe 44 interconnecting the engine unit 3 and the fuel tank 41 to permit return flow of excess combustible fuel in the engine unit 3 to the fuel tank 41.

The engine unit 3 includes: a cylinder block 32; an intake manifold 33 that is connected to the cylinder block 32, that is provided with passages 331, and that is further connected to the oxyhydrogen gas pipe 42 of the oxyhydrogen generating unit 7 such that the oxyhydrogen gas generated by the oxyhydrogen generating unit 7 is fed into the passages 331; and fuel injectors 34 that are connected to the intake manifold 33, that are further connected to the fuel-feeding pipe 43 of the combustible fuel supply unit 4, and that serve to inject the combustible fuel stored in the combustible supply unit 4 into the passages 331 of the intake manifold 33. Therefore, the oxyhydrogen gas from the oxyhydrogen gas pipe 42 is mixed with the combustible fuel from the fuel injectors 34 in the passages 331 of the intake manifold 33 to result in hybrid fuel that is supplied to the cylinder block 32 for combustion, thereby resulting in a mechanical power output for driving movement of the oxyhydrogen vehicle. The engine unit 3 further includes a driver 31 coupled to the cylinder block 32 so as to be driven thereby.

Preferably, the oxyhydrogen vehicle further includes a gas filter 51 and a vapor filter 53 that are disposed on the oxyhydrogen gas pipe 42. The gas filter 51 is used for filtering the oxyhydrogen gas that is supplied by the oxyhydrogen generating unit 7 to the engine unit 3 so as to enhance purity of the oxyhydrogen gas. The vapor filter 53 is used for removing electrolyte vapor from the oxyhydrogen gas flowing through the oxyhydrogen gas pipe 42.

Figure 4:
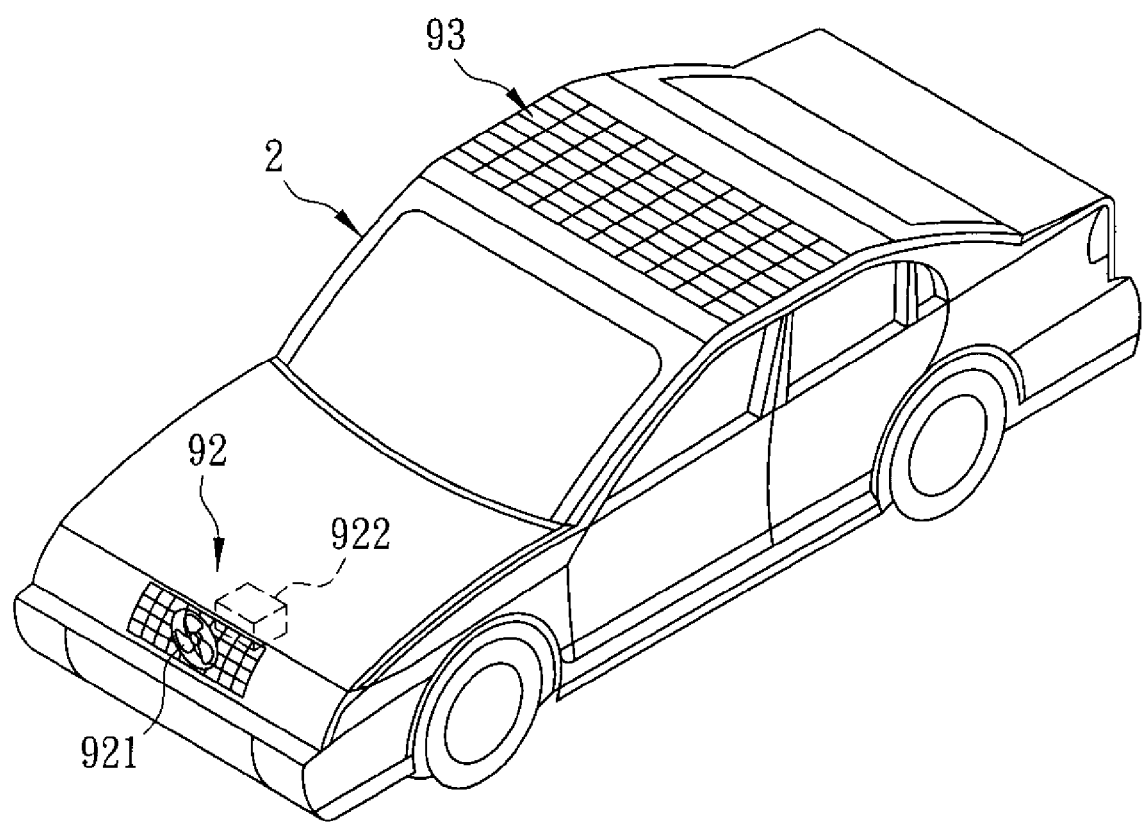
FIG. 4 is a perspective view illustrating the oxyhydrogen vehicle of the preferred embodiment provided with a wind energy converter and a solar energy converter.

Referring to FIGS. 2 to 4, the electric power supply system 9 is disposed on the vehicle body 2 and includes: a storage battery 95; an alternator 91 that is coupled to and driven by the driver 31 of the engine unit 3, and that is electrically connected to the storage battery 95 for charging the storage battery 95 in a known manner; a current controller 94 electrically connecting the storage battery 95 and the alternator 91 to the oxyhydrogen generating unit 7 for controlling electric current flow to the oxyhydrogen generating unit 7; and an auxiliary electricity generating unit 90 that is electrically connected to the storage battery 95, and that is adapted to be driven by renewable energy resources, such as solar energy, wind energy and combination thereof, so as to generate an electrical output for charging the storage battery 95.

In this embodiment, the auxiliary electricity generating unit 90 includes a wind energy converter 92 for converting wind energy into the electrical output, and a solar energy converter 93 disposed on the vehicle body 2 for converting solar energy into the electrical output. Preferably, the wind energy converter 92 is mounted on the vehicle body 2 and includes a rotating component 921 for converting the wind energy into a mechanical output, and an electromechanical converter 922 connected to the rotating component 921 and converting the mechanical output of the rotating component 921 into the electrical output that is supplied to the storage battery 95.

By virtue of the current controller 94 of the electric power supply system 9, the oxyhydrogen generating unit 7 is capable of generating an appropriate amount of the oxyhydrogen gas fed into the engine unit 3 to result in adequate supply of the hybrid fuel. In particular, when the oxyhydrogen vehicle of the preferred embodiment runs at a fast speed, and fuel consumption of the engine unit 3 increases, the current controller 94 increases the electric current flow to the oxyhydrogen generating unit 7, such that the oxyhydrogen generating unit 7 is able to generate more oxyhydrogen gas for generating more hybrid fuel.

Moreover, when the alternator 91 does not operate to charge the storage battery 95, the wind energy converter 92 and the solar energy converter 93 of the auxiliary electricity generating unit 90 still can generate the electrical output for charging the storage battery 95. Therefore, it can be ensured that there is a sufficient amount of electric energy stored in the storage battery 95.

In sum, because the engine unit 3 of this invention runs on the hybrid fuel, consumption of the combustible fuel can be reduced, combustion efficiency of the combustible fuel can be enhanced, and carbon monoxide emissions can be reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An oxyhydrogen vehicle comprising:
   an oxyhydrogen generating unit for electrolytically converting an electrolyte into oxyhydrogen gas;
   a combustible fuel supply unit for storing combustible fuel;
   an engine unit coupled to said oxyhydrogen generating unit and said combustible fuel supply unit, mixing the oxyhydrogen gas from said oxyhydrogen generating unit and the combustible fuel from said combustible fuel supply unit to result in hybrid fuel, and providing a mechanical power output from combustion of the hybrid fuel; and
   an electric power supply system electrically connected to said oxyhydrogen generating unit for providing electric power thereto, said electric power supply system including
   a storage battery,
   an alternator coupled to and driven by said engine unit so as to generate an electrical output, said alternator being electrically connected to said storage battery for charging said storage battery,
   a current controller electrically connecting said storage battery and said alternator to said oxyhydrogen generating unit for controlling electric current flow to said oxyhydrogen generating unit, and
   an auxiliary electricity generating unit electrically connected to said storage battery, and adapted to be driven by renewable energy resources selected from the group consisting of solar energy, wind energy and combinations thereof so as to generate an electrical output for charging said storage battery.

2. The oxyhydrogen vehicle as claimed in claim 1, wherein said auxiliary electricity generating unit includes a wind energy converter for converting wind energy into the electrical output.

3. The oxyhydrogen vehicle as claimed in claim 2, further comprising a vehicle body, said wind energy converter being mounted on said vehicle body and including a rotating component for converting the wind energy into a mechanical output, and an electromechanical converter that is connected to said rotating component and that converts the mechanical output of said rotating component into the electrical output that is supplied to said storage battery.

4. The oxyhydrogen vehicle as claimed in claim 2, wherein said auxiliary electricity generating unit further includes a solar energy converter for converting solar energy into the electrical output.

5. The oxyhydrogen vehicle as claimed in claim 3, wherein said auxiliary electricity generating unit further includes a solar energy converter disposed on said vehicle body for converting solar energy into the electrical output.

6. The oxyhydrogen vehicle as claimed in claim 1, wherein said auxiliary electricity generating unit further includes a solar energy converter for converting solar energy into the electrical output.

7. The oxyhydrogen vehicle as claimed in claim 1, further comprising a gas filter for filtering the oxyhydrogen gas that is supplied by said oxyhydrogen generating unit to said engine unit.

8. The oxyhydrogen vehicle as claimed in claim 1, further comprising a vapor filter for removing electrolyte vapor from the oxyhydrogen gas supplied to said engine unit by said oxyhydrogen generating unit.

9. The oxyhydrogen vehicle as claimed in claim 1, wherein said engine unit includes:
   a cylinder block;
   an intake manifold that is connected to said cylinder block, that is provided with passages, and that is further connected to said oxyhydrogen generating unit such that the oxyhydrogen gas generated by said oxyhydrogen generating unit is fed into said passages; and
   fuel injectors that are connected to said intake manifold, that are further connected to said combustible fuel supply unit, and that serve to inject the combustible fuel stored in said combustible fuel supply unit into said passages;
   the oxyhydrogen gas from said oxyhydrogen generating unit being mixed with the combustible fuel from said fuel injectors in said passages to result in the hybrid fuel that is supplied to said cylinder block.

10. The oxyhydrogen vehicle as claimed in claim 9, wherein said engine unit further includes a driver coupled to said cylinder block so as to be driven thereby, said driver being further coupled to said alternator for driving said alternator.

* * * * *